(12) United States Patent
Ukil et al.

(10) Patent No.: US 9,565,559 B2
(45) Date of Patent: Feb. 7, 2017

(54) METHOD AND SYSTEM FOR PRESERVING PRIVACY DURING DATA AGGREGATION IN A WIRELESS SENSOR NETWORK

(75) Inventors: Arijit Ukil, Kolkata (IN); Jaydip Sen, Kolkata (IN)

(73) Assignee: Tata Consultancy Services Limited (IN)

( * ) Notice: Subject to any disclaimer, the term of this patent is extended or adjusted under 35 U.S.C. 154(b) by 306 days.

(21) Appl. No.: 14/112,917

(22) PCT Filed: Jun. 9, 2011

(86) PCT No.: PCT/IN2011/000385
§ 371 (c)(1),
(2), (4) Date: Oct. 18, 2013

(87) PCT Pub. No.: WO2012/143931
PCT Pub. Date: Oct. 26, 2012

(65) Prior Publication Data
US 2014/0047242 A1    Feb. 13, 2014

(30) Foreign Application Priority Data
Apr. 21, 2011 (IN) .......................... 1283/MUM/2011

(51) Int. Cl.
*H04L 29/06* (2006.01)
*H04W 12/04* (2009.01)
(Continued)

(52) U.S. Cl.
CPC .............. *H04W 12/04* (2013.01); *H04L 9/083* (2013.01); *H04W 12/02* (2013.01); *H04W 84/18* (2013.01)

(58) Field of Classification Search
CPC ...... H04W 12/04; H04W 84/18; H04W 12/02; H04L 9/083
(Continued)

(56) References Cited

U.S. PATENT DOCUMENTS 6,195,751 B1 * 2/2001 Caronni ................ H04L 12/185
713/162
6,865,517 B2 * 3/2005 Bantz ...................... H04L 67/12
702/104
(Continued)

OTHER PUBLICATIONS

Perrig et al., Security in Wireless Sensor Networks, ACM, Jun. 2004.*
(Continued)

*Primary Examiner* — David García Cervetti
(74) *Attorney, Agent, or Firm* — Finnegan, Henderson, Farabow, Garrett & Dunner, LLP

(57) ABSTRACT

A computer-based system and method for secured privacy preservation scheme while data aggregation in a non-hierarchical wireless sensor network that lacks peer-to-peer communication between the communicating sensor nodes is disclosed. The method and system adopts formation of self-adaptive efficient cluster formation for robust privacy preservation in the network by grouping the multiple sensor nodes in the network to form multiple clusters that enables low computation overhead and high scalability in the network. The method and system of the invention discloses an effective twin-key management scheme that provides establishment of secure communication among the sensor nodes and the secure communication between at least one sensor node with the sever node performing the function data aggregation of the data collected by the sensor nodes.

13 Claims, 10 Drawing Sheets

(51) Int. Cl.
*H04L 9/08* (2006.01)
*H04W 12/02* (2009.01)
*H04W 84/18* (2009.01)

(58) Field of Classification Search
USPC ........ 713/171, 153, 150, 160; 726/1, 23, 26, 726/27; 380/270, 281, 278; 705/51, 57, 69
See application file for complete search history.

(56) References Cited

U.S. PATENT DOCUMENTS

| | | | | |
|---|---|---|---|---|
| 7,434,046 B1* | 10/2008 | Srivastava | ............ | H04L 9/0825 380/264 |
| 7,702,905 B2* | 4/2010 | Girao | .................... | H04W 12/04 713/163 |
| 8,050,410 B2* | 11/2011 | Sanders | ................ | H04L 9/0852 380/263 |
| 8,205,085 B2* | 6/2012 | Yao | ....................... | H04L 9/0822 380/277 |
| 8,230,217 B2* | 7/2012 | He | .......................... | H04L 9/065 713/168 |
| 8,255,689 B2* | 8/2012 | Kim | ........................ | H04L 67/12 713/153 |
| 8,280,057 B2* | 10/2012 | Budampati | ......... | H04L 63/0464 380/270 |
| 8,345,879 B2 | 1/2013 | Singh | | |
| 8,397,062 B2 | 3/2013 | Roy-Chowdhury et al. | | |
| 8,605,694 B2* | 12/2013 | Park | ...................... | H04W 28/06 370/330 |
| 8,607,057 B2* | 12/2013 | Nath | ....................... | H04L 9/008 370/389 |
| 8,737,226 B2* | 5/2014 | Liang | .................... | H04W 84/18 370/235 |
| 8,856,227 B2* | 10/2014 | Choi | .................. | H04W 40/026 370/235 |
| 2005/0044356 A1* | 2/2005 | Srivastava | ............ | H04L 9/0827 713/163 |
| 2006/0167634 A1* | 7/2006 | Cho | ........................ | H04L 45/00 702/5 |
| 2007/0115827 A1* | 5/2007 | Boehnke | ................ | G08C 17/02 370/236 |
| 2007/0171050 A1* | 7/2007 | Westhoff | ............... | H04W 12/02 340/539.22 |
| 2007/0253376 A1* | 11/2007 | Bonta | ................... | H04L 9/0822 370/338 |
| 2008/0025330 A1* | 1/2008 | Wang | .................. | H04L 63/0428 370/406 |
| 2008/0044028 A1 | 2/2008 | Sun et al. | | |
| 2008/0215609 A1* | 9/2008 | Cleveland | .............. | G01D 21/00 |
| 2008/0247539 A1* | 10/2008 | Huang | ................ | H04L 63/0428 380/28 |
| 2008/0263647 A1* | 10/2008 | Barnett | ................. | H04L 9/0822 726/6 |
| 2008/0292105 A1* | 11/2008 | Wan | ...................... | H04L 9/0825 380/282 |
| 2009/0054036 A1* | 2/2009 | Chen | .................... | H04L 9/0833 455/411 |
| 2009/0059842 A1* | 3/2009 | Maltseff | ................ | H04W 8/005 370/328 |
| 2009/0129599 A1* | 5/2009 | Garcia | .................... | H04L 9/083 380/279 |
| 2009/0141898 A1* | 6/2009 | Huang | .................. | H04L 9/0833 380/270 |
| 2009/0268914 A1 | 10/2009 | Singh et al. | | |
| 2009/0303237 A1* | 12/2009 | Liu | ...................... | H04L 63/0414 345/440 |
| 2010/0061557 A1* | 3/2010 | Youn | ..................... | H04L 63/062 380/279 |
| 2010/0082988 A1 | 4/2010 | Huebner et al. | | |
| 2010/0085948 A1* | 4/2010 | Yu | ........................... | H04L 12/66 370/338 |
| 2010/0090823 A1* | 4/2010 | Park | ....................... | G01S 5/0294 340/539.1 |
| 2010/0098090 A1* | 4/2010 | Westhoff | ................ | H04L 9/008 370/400 |
| 2010/0135494 A1* | 6/2010 | Armknecht | ............. | H04L 9/083 380/270 |
| 2010/0268943 A1 | 10/2010 | Roy-Chowdhury et al. | | |
| 2011/0261962 A1* | 10/2011 | Dupuis | ................. | H04L 9/0836 380/279 |
| 2012/0008787 A1* | 1/2012 | Wan | ...................... | H04L 9/0825 380/285 |
| 2013/0223627 A1* | 8/2013 | Noda | .................... | H04W 12/04 380/270 |

OTHER PUBLICATIONS

Liu et al., Establishing Pairwise Keys in Distributed Sensor Networks, ACM, Feb. 2005.*
Zhu et al., LEAP+: Efficient Security Mechanisms for Large-Scale Distributed Sensor Networks, ACM, Nov. 2006.*
Castelluccia et al., Efficient Aggregation of encrypted data in Wireless Sensor Networks,IEEE, Jul. 2005.*
Massie et al., The ganglia distributed monitoring system: design, implementation, and experience, Elsevier, 2004.*
Zanikolas et al., A taxonomy of grid monitoring systems, Elsevier, 2004.*
Shi et al., PriSense: Privacy-Preserving Data Aggregation in People-Centric Urban Sensing Systems, IEEE, 2010.*
He et al., PDA: Privacy-preserving Data Aggregation in Wireless Sensor Networks, IEEE, 2007.*
Chan et al., Random Key Predistribution Schemes for Sensor Networks, IEEE, 2003.*
Conti et al., Privacy-preserving robust data aggregation in wireless sensor networks, Wiley InterScience, Jan. 2009.*
Woo-Sung Jung, Keun-Woo Lim, Young-Bae Ko, Sang-Joon Park, Grad. Sch. of Inf. & Commun., Ajou Univ., Korea, "A Hybrid Approach for Clustering-Based Data Aggregation in Wireless Sensor Networks" (2008), 6 pages.
Prakash G L, Thejaswini M, S H Manjula, K R Venugopal, L M Patnaik, "Secure Data Aggregation Using Clusters in Sensor Networks", World Academy of Science, Engineering and Technology 51 (2009), 6 pages.
International Search Report mailed Nov. 25, 2011, in International Application No. PCT IN/2011/000385, 2 pages.

* cited by examiner

METHOD AND SYSTEM FOR PRESERVING PRIVACY DURING DATA AGGREGATION IN A WIRELESS SENSOR NETWORK

PRIORITY CLAIM

This is a National Stage Entry under 35 U.S.C. §271 of International Application No. PCT/IN2011/000385, titled "A METHOD AND SYSTEM FOR PRESERVING PRIVACY DURING DATA AGGREGATION IN A WIRELESS SENSOR NETWORK," filed Jun. 9, 2011, which claims the benefit of India Application No. 1283/MUM/2011, titled "A METHOD AND SYSTEM FOR PRESERVING PRIVACY DURING DATA AGGREGATION IN A WIRELESS SENSOR NETWORK," filed on Apr. 21, 2011, both of which are incorporated herein in their entirety by reference for all purposes.

FIELD OF THE INVENTION

The invention generally relates to the field of data aggregation in a flat wireless sensor network. More particularly, the invention relates to a method and system for privacy preservation during aggregation of data collected by various sensor nodes in a single-hop non-hierarchical wireless sensor network.

BACKGROUND OF THE INVENTION

Wireless sensor networks (WSN) have been used today in various applications such as tracking safety of the residential buildings, vehicle tracking, wildlife tracking and environmental surveillance etc. Thus, wireless sensor networks are gaining worldwide popularity and have been deployed in various environments including offices, homes and hostile areas.

Privacy is an important issue in today's context of extreme penetration of Internet and mobile technologies. Recently, large-scale data collection and integration efforts have increased privacy concerns. In the wireless sensor network, during data aggregation, the server node or data aggregator node may be able to find the private content of the data of the individual sensor node responsible for collecting tracking data in the particular area. Further, wireless links may be eavesdropped by attackers to reveal private data.

Thus, during data aggregation, the preservation of privacy of data at the sensor nodes needs to be ensured so that each sensor node's data should be known to itself. The task of the server node should be restricted only to perform data aggregation operation and execute further processing on the aggregated data only and to avoid it to reveal private content of the data at the sensor nodes. Further, the eavesdropping of wireless links by attackers should be avoided.

There have been efforts made in the past for preserving private data of the sensor nodes while aggregating the data in the wireless sensor network. Some of the prior arts know to us are as follows:

Prior Arts

The paper titled "PDA: Privacy-preserving Data Aggregation in Wireless Sensor Networks" by He. W. et al published in IEEE INFOCOM, pp. 2045-2053. IEEE Press, New York (2007) discloses a Cluster-based Private Data Aggregation (CPDA) scheme that teaches cluster formation in a peer-to-peer network for aggregating data securely in the wireless sensor networks.

The paper titled "Achieving Privacy Preservation when Sharing Data for Clustering" by 2.

Oliveira, S. R. M et al published in SDM 2004, LNCS, Vol. 4 discloses a spatial data transformation method called Rotation-Based Transformation (RBT) to rectify the problem of protecting the underlying attribute values when sharing data for clustering.

US20080247539 by Huang; Shih-I et al discloses a method and system for secure aggregation of data based on simple symmetric key encryption algorithm.

US20090141898 by Huang; Shih-I et al discloses a method and system for privacy preservation scheme for hierarchical network by adopting private symmetric key algorithm.

US7702905 by Girao, et al discloses method and system for data aggregation in a wireless sensor network using LEACH protocol for selecting data aggregator for aggregating the data and enables multi-hop distribution of encryption keys for data encryption.

US20080044028 by Sun; Hung-Min et al discloses a method and system for distribution of keys in the network, wherein a node in the network initiates key management where the key pool of one of the designated nodes is utilized by its neighboring nodes and thus propagates in the network.

State of the Art Suffers from Following Limitations:

State of the art solution considers the existence of peer-to-peer communication between the sensor nodes which may not be possible in most of the real-life use applications. Further, computation of the privacy preservation algorithm proposed in the state of art increases with the increase in number of sensor nodes.

In most of the practical and real-life scenarios, the sensor nodes cannot communicate directly with each other using a peer-to-peer mode of communication. In such cases, the disclosed methods in the state of art are not useful.

For example, considering the privacy preserved computation of Television Rating Points (TRP) computation, it is observed that the limitations of the state of art in regard to existence of peer-to-peer communication between sensor nodes and increase of computational complexity of privacy preservation algorithm forbid the state if art to be useful for computing TRP.

TRP is the criterion that indicates the popularity of a channel or program and this data is very useful for the advertisers, which has good amount of business impact. TRP is generally calculated by frequency monitoring of the audience by preparing an aggregated data on the viewership to find the statistics of different channels at different location and different time. For the TRP calculation perspective, individual viewership statistics is not required, the aggregated viewership value of a particular location of particular channel is sufficient. There is a scope that individual viewership in the most granular form is recorded and utilized for commercial purpose. But the viewers might not be willing to share the information on their pattern of channel viewing. So, the aggregation of individual viewer's data at the service provider end needs to be privacy protected, i.e. the service provider will aggregate the viewer's data without particularly knowing the individual content of the viewer's data.

Thus, real-time applications such as TRP computations and many others may not be feasible with the methods described in state of the art. Also, the computational complexity in the state of art proposed by He. W et al increases exponentially with the addition of sensor nodes and cluster in the network. Further, none of the state of art discloses a method for preserving data privacy while data aggregation in a wireless sensor network that lacks peer-to-peer communication mode between the sensor nodes. Moreover, the methods disclosed in the state of art lacks scalability and suffer high computational overhead.

Thus, in the light of the above mentioned prior arts, it is evident that, there is a need for system and method that provides a novel way of computing privacy preservation data aggregation with low complexity and high scalability in the networks where peer-to-peer communication between sensor nodes does not exists, which is a very practical scenario in various real-life applications.

SUMMARY OF THE INVENTION

Before the present methods, systems, and hardware enablement are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The present invention provides method and system for efficient and secure data aggregation scheme in a wireless non-hierarchical sensor network. The network comprises several sensor nodes reporting to a query server and the server aggregates the data sent by the sensor nodes, while preserving the privacy of the data. The present invention avoids the server to obtain the content of data of the sensor nodes. The invention does not require peer-to-peer communication among the sensor nodes and has the advantage of low computation time even in the presence of large number of sensor nodes.

The present invention enables efficient and self-adaptive cluster formation among the sensor nodes in absence of peer-to-peer communication among the sensor nodes that provides low computational complexity and highly scalable data preservation algorithm during data aggregation in the wireless sensor network.

The invention provides robust twin key management scheme between the sensor nodes and the sensor nodes with the server node for establishing secure communication among the sensor nodes and between sensor nodes and the server node respectively.

The proposed invention has potential applications in practical cases such as TRP measurement, smart energy meter reading communication etc.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and architecture disclosed in the drawings:

FIG. 5 (c) shows the probability of common key between the nodes with the increase in the number of shared keys between the nodes according to an exemplary embodiment of the invention.

DETAILED DESCRIPTION OF THE INVENTION

Some embodiments of this invention, illustrating its features, will now be discussed:

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems, methods, apparatuses, and devices similar or equivalent to those described herein can be used in the practice or testing of embodiments of the present invention, the preferred, systems and parts are now described. The disclosed embodiment is merely exemplary of the invention, which may be embodied in various forms. The scope of the invention is not restricted to the listed embodiments and is limited only by the appended claims.

The present invention enables a time-efficient self-adaptive cluster formation in a wireless sensor network for providing privacy preservation data aggregation with low complexity and high scalability wherein no peer-to-peer communication exists between the sensor nodes in the network.

Figure 1:
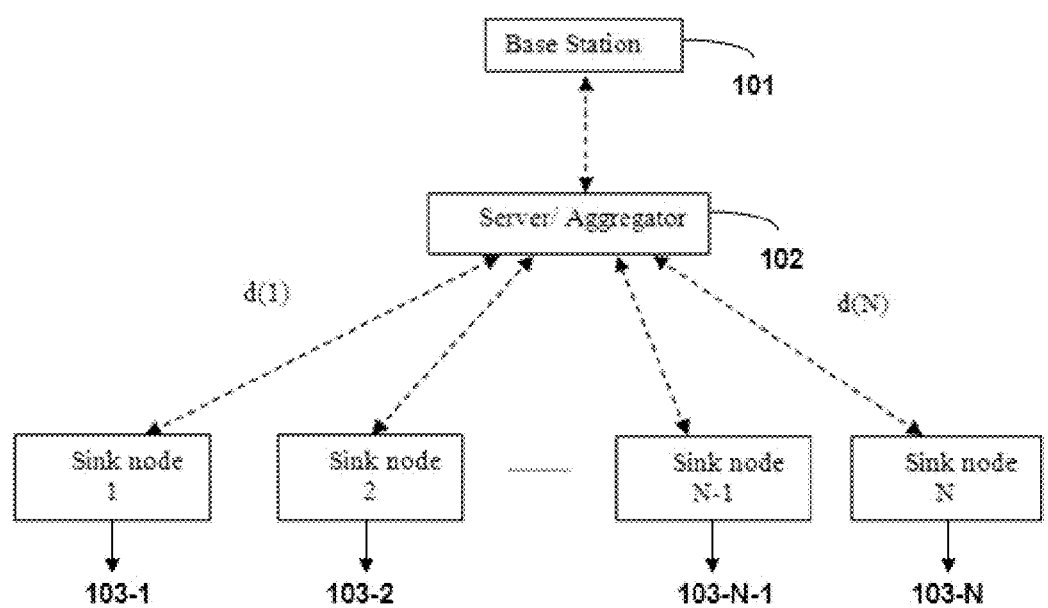
FIG. 1 schematically shows a single-hop wireless sensor network architecture 100 containing different system elements for secure data aggregation in a wireless sensor network in accordance to an exemplary embodiment of the invention.

FIG. 1 refers to a single-hop wireless sensor network (WSN) 100 termed Simplified Privacy Preserving Data Aggregation (SPPDA) model consisting of various hardware elements which collectively achieve the task of data aggregation in a wireless sensor network according to exemplary embodiment of the present invention.

In an embodiment of the present invention, as shown in the FIG. 1, the system 100, includes three types of nodes in the wireless sensor network including base station (BS) 101, server/aggregator node 102 and sink/sensor nodes 103-1, 103-2, 103-3 . . . 103-N. The server/aggregator node 102 performs the function of data aggregation and further processing of the aggregated data and then to send the result to the BS 101. The server node 102 has connection with N number of sink/sensor nodes 103-1 . . . 103-N which are connected to the server node 102 through wireless links d (1), d (2), d (3) . . . d (N). It is assumed that no peer-to-peer communication exists between the sink/sensor nodes in the single-hop wireless sensor network (WSN) 100 shown in FIG. 1. The single WSN 100 is considered as a sub-set of a big multi-hop WSN, but for the sake of simplicity, the single-hop WSN is assumed for the descriptive purpose.

The sink/sensor nodes collect the data on their own or as per the instructions received from the server/aggregator node 102. It is assumed that the sink/sensor nodes in the network do not have peer-to-peer connectivity. Therefore, if one of the multiple sensor nodes likes to establish communication with other sink/sensor nodes, it has to do it through server/aggregator node 102. This results in elimination of scalability infeasibility problem that is observed in the state of art.

In order to communicate with other sink/sensor nodes in the network, the sink/sensor node requests to the server/aggregator node 102. The server node 102 performs forwarder function.

To implement the privacy preserving policy, one sink/sensor node needs to communicate with the other sensor node in the network which is done securely by pair-wise key establishment technique. However, in most of the practical scenarios such as computing TRP, this pair-wise key establishment and direct communication between the sink/sensor nodes are not possible.

The proposed SPPDA model 100 implements an efficient privacy preserving algorithm that overcomes the limitation of peer-to-peer communication between the sensor nodes by efficient self-adaptive cluster formation and ensures security issues by providing robust key management scheme described detail later in the specification.

In the SPPDA model shown in FIG. 1, it is assumed that the communication between the server node 102 and each of the sink/sensor nodes 103-1 . . . 103-N are accurate without loss of data. Further, it is assumed that sink/sensor nodes are always in the communication range with the server/aggregator node 102. The server node 102 notifies the neighboring sink/sensor nodes of one of the sink/sensor nodes if there is failure in communication of that particular sink/sensor node with the server node 102.

Figure 2:
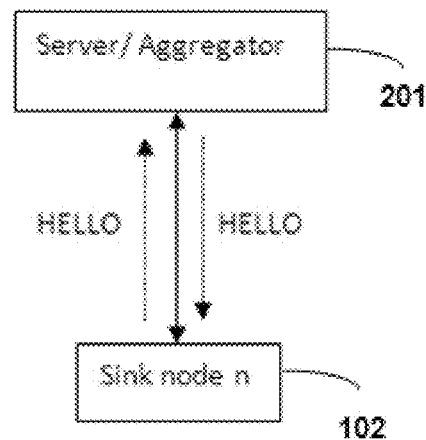
FIGS. 2 (a), 2 (b) and 2 (c) represents block diagrams showing the steps followed in forming self-adaptive cluster formation in a wireless sensor network in accordance to an exemplary embodiment of the invention.
Figure 2:
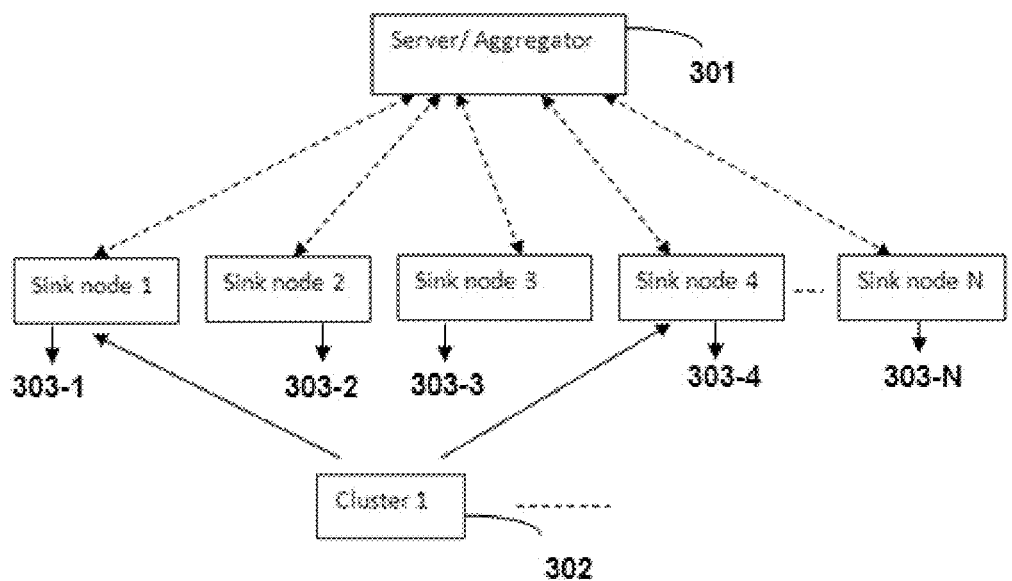
Figure 2:
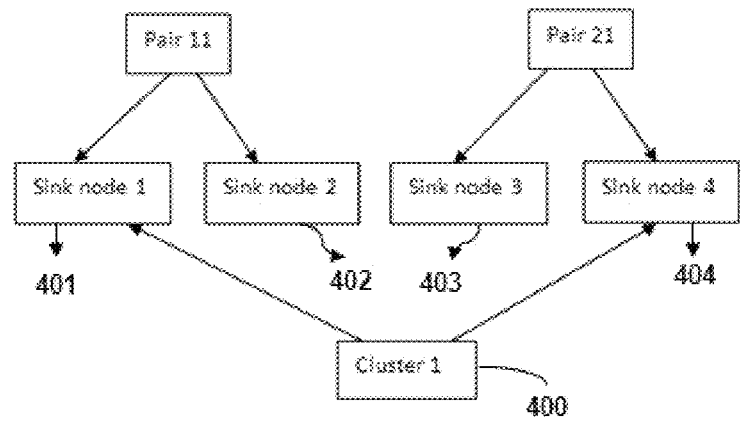

FIG. 2 (a), (b) and (c) shows block diagrams depicting the formation of efficient self-adaptive clusters in the single-hop wireless sensor network. In order to provide scalability of the system, secure communication between the nodes and minimum probability of privacy disclosure, an efficient cluster formation is required. This cluster formation helps in providing security of sink to sink communication, which eventually leads to successful implementation of the privacy preservation algorithm without direct sink to sink communication. These sink nodes collect data and send it to the server. The cluster formation algorithm is as follows:

FIG. 2 (a) shows the first step of cluster formation in an embodiment of the present invention. The server/aggregator node 201 broadcasts "Hello" message to multiple sink/sensor nodes 202 in the network. Then the server node 201 waits for acknowledgment from the sink/sensor nodes. Upon receiving the response from some of the multiple the sink/sensor nodes to the broadcasted "Hello" message from the server/aggregator node 201, the server gets the idea of the active nodes in the network.

FIG. 2 (b) shows the second step of cluster formation in an embodiment of the present invention. The server/aggregator node 301 as shown in FIG. 2 (b) divides the active nodes recognized in the first step to form a group of clusters. Each cluster consists of four active sink/sensor nodes that reports the data collected to the server/aggregator node 301. Thus, there are N/4 clusters formed in the network, where N equals number of active sink/sensor nodes in the network. However, if N/4 is not an integer, there may be few clusters formed with five active nodes in the network. It is observed that the number of clusters with five active nodes will be less than or equal to 3.

As shown in FIG. 2 (b), "Cluster 1" 302 is formed with four sink/sensor nodes. Similarly, the other sink/sensor nodes in the network are divided into clusters, each cluster comprising four active sink/sensor nodes. The cluster formation information is shared among the other sink/sensor nodes in the network by the server/aggregator node 301. These other sink/sensor nodes are termed as neighbors of the cluster the sinks/sensor node belongs. For example, in FIG. 2 (b) sink/sensor nodes 303-1, 303-2, 303-3 and 303-4 belonging to Cluster 1 302 and this information is shared to each of these nodes by the server/aggregator node 301.

The server/aggregator node 301 selects the sink/sensor node pair within the cluster and informs the information about forming a sink/sensor node pair to other sink/sensor nodes in the cluster.

For example, in an embodiment of the present invention, consider the cluster formation shown in FIG. 2 (c). The server/aggregator node (not shown in FIG. 2 (c)) selects sink/sensor node 1 401 and sink/sensor node 2 402 to form "pair 11" from cluster 1 400. Similarly, the server/aggregator node (not shown in FIG. 2 (c)) selects sink/sensor node 3 403 and sink/sensor node 4 404 to form "pair 21" from cluster 1 400. In this way, the server/aggregator node selects two active sink/sensor nodes from each cluster to form pairs. The pairs formed by this principle are termed as friend pair.

In an embodiment, the server/aggregator node frequently monitors the status of the sink/sensor node by periodically broadcasting "Hello" message. In case, if any sink/sensor node fails to respond to the message received repetitively, that node is considered as passive or dead node by the server/aggregator node. This situation leads to regrouping of friend pair formation by the server/aggregator node and this may result in inclusion of three sink/sensor nodes within one pair. The server node then notifies this adjustment or regrouping of friend pair formation to the corresponding sink/sensor nodes. The objective of the server node is not to disturb the cluster after it is formed. In this scenario, when another node enters the network, the server node will try to accommodate it inside one of the clusters if that cluster has less than four members. Otherwise, that node is temporarily accommodated in one of the clusters. When four of such sink nodes available which have temporary membership of some clusters, these four forms a new cluster.

This self-adaptive and efficient cluster formation mechanism in a wireless sensor network enables low computational complexity in the network. The computational complexity in the prior art proposed by He. W et al increases exponentially with the addition of sink/sensor nodes and cluster in the network. In the present invention cluster formation mechanism, the computational complexity is fixed and is independent of the number of sink/sensor nodes in the network. The computational times required at different number of nodes in SPPDA scheme proposed in the present invention is compared with CPDA scheme by He. W et al based on experiment conducted, the results of which is observed in Table 1.

TABLE 1

Computational time in milli-second at different number of nodes for SPPDA and CPDA.

| SPPDA | CPDA | Number of sensor nodes |
| --- | --- | --- |
| 40 | 220 | 3 |
| 50 | 250 | 4 |
| 51 | 310 | 5 |

It is observed from Table 1 that when the number of sink/sensor nodes increases, the computational time in SPPDA remains almost constant, where as in CPDA the computational time increases more rapidly.

Figure 3:
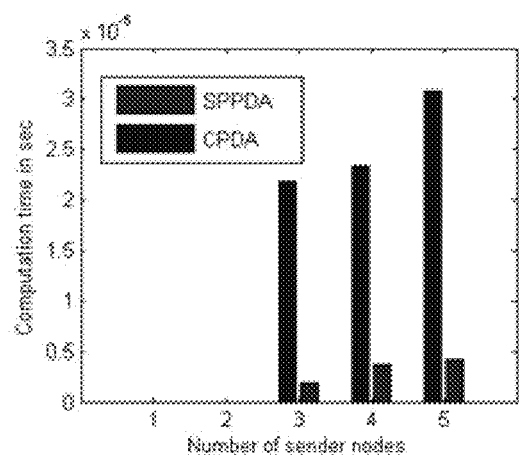
FIG. 3 shows comparison of computation time required for computing privacy preservation algorithm proposed in current invention and that required by the state of art solution in accordance to an exemplary embodiment of the invention.

This is further shown in FIG. 3, which also reveals that in SPPDA the computational time is substantially low than that of CPDA. Computational time difference between these two schemes becomes more visible when more number of nodes is considered. This is because of the fact that in SPPDA, for most of the cases (not considering the failure of a certain sink node, where three sink nodes may need to form a cluster), there will be fixed two number of sink nodes involved in the privacy preservation computation, the computational time becomes fixed. This is indeed a necessary requirement when the overall system is real-time in nature. In CPDA algorithm, the computational time increases almost linearly with the addition of number of nodes. SPPDA on the other hand, incurs very less computational load and does not have much affect with the addition of number of clients/sink nodes. As in CPDA, with number of nodes increases, the computational time increases, while in case of SPPDA proposed in the present invention the number of sink/sensor nodes is limited to five. It is also impractical in CPDA to have large number of sink nodes in a single cluster.

To provide support for ensuring privacy and integrity of messages sent from sink nodes to their corresponding aggregator or server, robust key exchange and management scheme is required. In an embodiment of the present invention, a robust twin-key management scheme is designed to satisfy operational and security requirements of a non hierarchical, single-hop sensor network by selectively distributing and removing keys from sensor nodes (including sink nodes and server) as well as re-keying nodes without substantial computations or bandwidth usage. The objectives of the proposed key management scheme are as follows.

To establish a key between all the sensor nodes that must exchange data securely in the network.

To support addition or deletion of nodes in the network.

To enable working of key management scheme in undefined deployment environment.

To disallow unauthorized nodes to communicate with any other nodes in the network.

In order to accomplish these objectives, the first step is to form cluster of the sink/sensor nodes. Let, there be N number of sink/sensor nodes and each cluster consists of n number of sink/sensor nodes. So, there will be N/n number of clusters. The key management scheme is initiated by key pre-distribution stage. In the pre-distribution phase, a large key-pool of K keys and corresponding identities are generated. These K number of keys are divided into two banks. First bank consists of k number of keys, which is used for sink/sensor node's communication with other sink/sensor nodes via the aggregator node and the second bank consists of (K-k) keys for sink/sensor nodes communication with the aggregator/server node.

Hence, the key management scheme consists of two parts described as follows:

Part I: Sink/Sensor Node to Aggregator/Server Node Key Establishment:

In an embodiment of the present invention, each sink/sensor node has K-k number of keys shared with the server. As, all the sink/sensor nodes possess the same keys, it is totally unsecure when a sink/sensor node communicates with the server/aggregator node with the shared key. Any malicious sink/sensor node can decipher the sink/sensor nodes' communication with the server and can launch attack very easily. In order to avoid this, in the pre-distribution phase, the sink/sensor-server key bank is randomly permuted and reordered for each sink/sensor-server pair. This ordering of the key bank is stored in the server node for each sink/sensor node. This is shown in FIG. 4(a).

When a new sink/sensor node is added in the network, identical procedure of key bank randomization as described is followed and the key order is stored offline for the new sink/sensor node. Now, the sink/sensor node communicates with the server node through one of its shared keys. To accomplish this action, the sink/sensor node first generates a random number between 1 and (K-k). This random number (Rc) is sent to the server in plain text. The server understands that the sink/sensor node will encrypt the next message by the Rcth number key of the key bank. The server node responds by sending ACK (acknowledgement). This is shown in FIG. 4(b).

Figure 4:
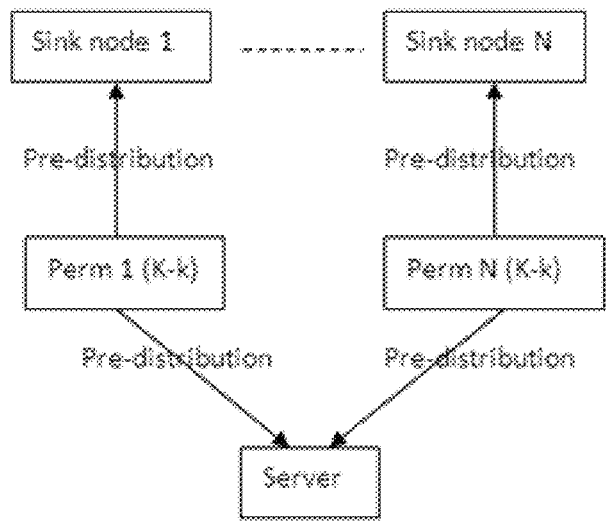
FIGS. 4 (a), 4 (b) and 4 (c) shows a block diagram showing the steps followed for server node to sink/sensor node key establishment and secure communication in a wireless sensor network in accordance to an exemplary embodiment of the invention.
Figure 4:
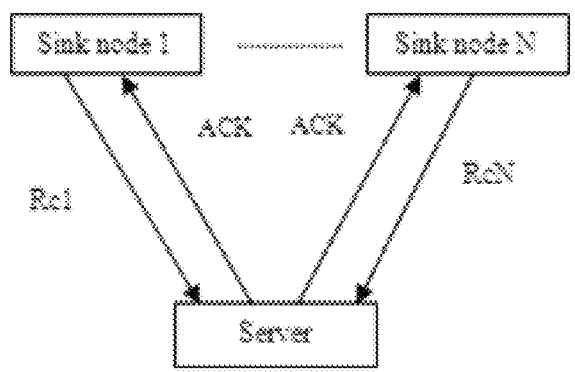
Figure 4:
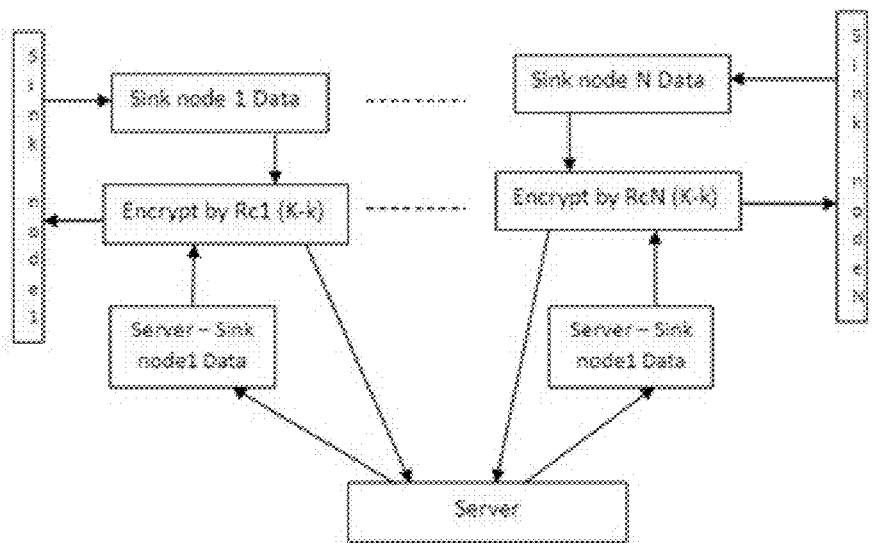

After receiving ACK (acknowledgement), the sink/sensor node encrypts the data with the particular key and sends to the server node. Every time the sink/sensor node likes to communicate with the server node, it does the same steps. This is shown in FIG. 4 (c). The random number generation process at each session hinders the probable guessing attack. It can also be observed that the random number (Rc) is sent to the sink/sensor node in plain text. But this does not arise any vulnerability issue, as getting the random number by a malicious node does not harm because of the pre-randomization of the key bank order. The Rcth number key is different in different sink/sensor nodes. The mapping is stored in the server node offline in pre-distribution stage.

Part II: Sink/Sensor Node to Sink/Sensor Node Key Establishment:

In an embodiment of the present invention, it is assumed that sink/sensor node to other sink/sensor node direct communication does not exist and this has to happen through the server/aggregator node. Further, it is also to be noted that the server node should not decipher the communication between the sink/sensor nodes; otherwise the privacy preservation algorithm becomes trivial for server node to break. In order to achieve that, the k numbers of keys are pre-stored in the sink nodes at the time of deployment, which the server node is unaware of. The server is only aware of (K-k) keys required for server node to sink/sensor node communication.

It is also a requirement that other sink/sensor nodes in the network should not decipher the message send by one of the sink/sensor node to another sink/sensor node in the network. For example, if the sink/sensor node 1 likes to communicate with sink/sensor node 2 and as the k keys are same for all the sink/sensor nodes in the network, it becomes easy for another sink/sensor node to decrypt the plain text, i.e. sink/sensor node 3 can decrypt what sink node 1 and sink/sensor node 2 are communicating.

To avoid this situation, sink/sensor node 1 and sink/sensor node 2 separately permute the key bank order of the k number of keys dedicated for sink/sensor node-to-sink/sensor node communication and reorder that randomly. Following the random permutation of the key bank, the sink/sensor nodes 1 and 2 pass the permute function to each other through the server node using their pair-wise key with the server node.

After successful delivery of permute functions, one of the sink/sensor nodes (sink/sensor node 1, for example) sends another random number between 1 and k to the other sink/sensor node (sink/sensor node 2, for example), which indicates the particular key of the permuted key bank. This pair-wise key between sink/sensor nodes will be used for the subsequent communication until the data aggregation is complete. For next round of data aggregation process, same key establishment procedure will be followed.

This robust twin key management scheme enables secure communication between individual sink/sensor nodes and communication between one of the sink/sensor nodes and the server node without any loss of private content of data at the individual sink/sensor nodes. This helps in preserving privacy while data aggregation in the network with no peer-to-peer communication between the communicating nodes. There is no probability of disclosure of private data of the individual sink/sensor nodes to unauthorized or malicious nodes.

In CPDA scheme proposed in state of art by He. W et al, there exists certain probability where private data may be disclosed. This can only happen when the sink nodes exchange messages within the cluster. This can be estimated as:

$$P(b) = \sum_{m=pc}^{Dmax} P(k=m)(1-(1-b^{m-1})^m)$$

Where Dmax=maximum cluster size,
pc=minimum cluster size (=2, two sink nodes),
k=cluster size,
b=probability that link level privacy is broken,
P(k=m)=probability that a cluster size is m.

Now, for SPPDA scheme proposed in the present invention:
pc=Dmax=k=2, and therefore P(k=m)=1.

Figure 5:
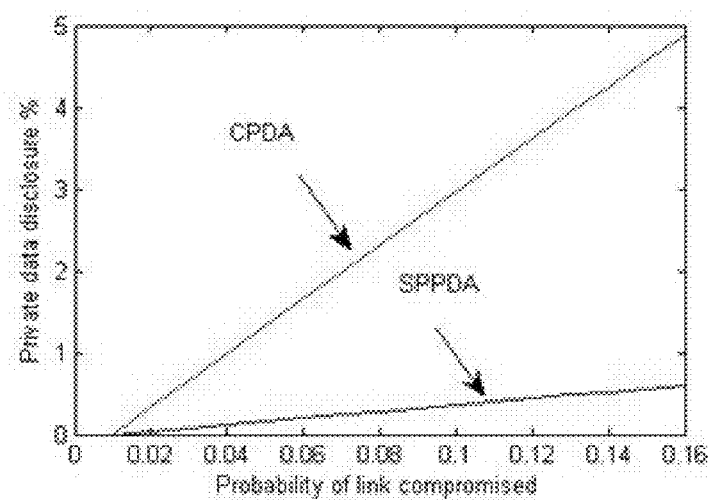
FIGS. 5 (a) and 5 (b) shows comparison of probability of private data disclosed proposed in current invention and that disclosed by the state of art solution in accordance to an exemplary embodiment of the invention.
Figure 5:
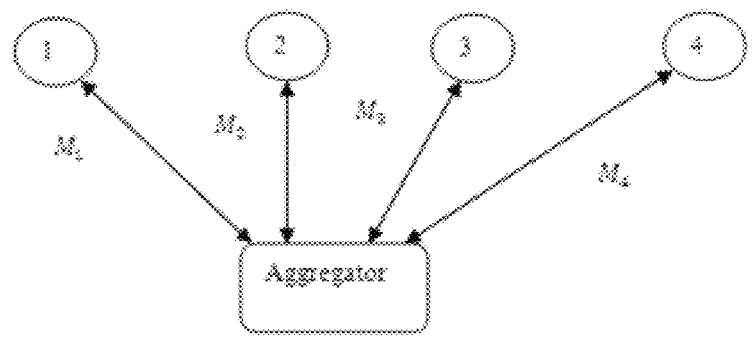
Figure 5:
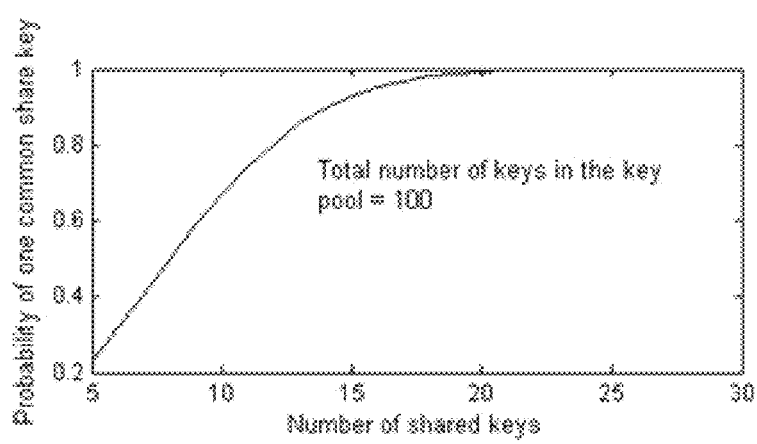

Therefore, it is observed that the probability of privacy compromised in CPDA has much steeper slope than that of SPPDA. The plot is shown in FIG. 5 (a).

In CPDA, a requirement is that a pair of sink/sensor nodes possessing same pair of keys, where the keys are taken randomly from a large pool of key, should be high. Otherwise, the scheme cannot work. But, this requirement helps other nodes to capture at least some of the communication, if it has common pair of keys.

Consider the scenario in FIG. 5(b). As shown in the figure, there are three nodes, node 1, node 2 and node 3. The key between node 1 and aggregator/server node is M1, and that between node 2 and aggregator/server node is M2. Similarly, the key between node 3 and aggregator/server node is M3 and that between node 4 and aggregator is M4.

It is observed that certain probability (may be very small) exists that same keys may be shared between the nodes in CPDA. For example, the same key is shared between node 1 and aggregator/server node as that between node 2 aggregator/server node (i.e. M1=M2). This violates the strict security requirement in certain use cases. In fact, in CPDA scheme the probability of sharing keys between the nodes increases with the number of sink/sensor nodes in the network.

However, in SPPDA, key distribution is totally deterministic and avoids security vulnerability problem in the network. However, this may lead need in increasing the number of keys in the key pool. Further, the key management scheme proposed in the present invention is such that total randomization is done for key distribution process forming of friend pair of nodes in the cluster is controlled by the aggregator/server node.

The number of nodes forming a friend pair is determined by the server which ideally is two in most of the cases, unless one of the sink/sensor nodes becomes passive or dead. Thus, elimination of this kind of situation that a pair of nodes find common key is not deterministic makes SPPDA much more secure and robust against different attacks.

Figure 6:
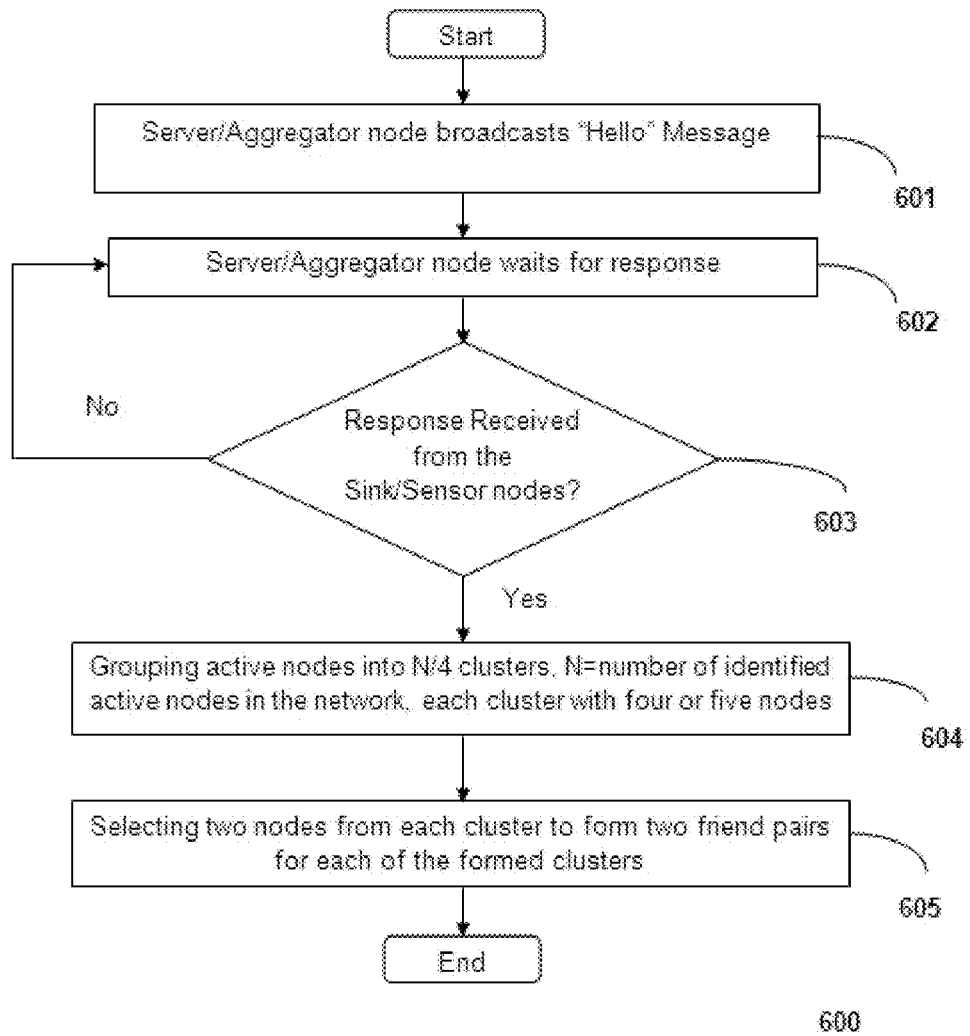
FIG. 6 is a flow chart 600 describing the steps carried out for the formation of efficient and self-adaptive cluster formation in a wireless sensor network during data aggregation in accordance to an exemplary embodiment of the invention.

FIG. 6 is a flow chart 600 describing the steps carried out for the formation of efficient and self-adaptive cluster formation in a wireless sensor network during data aggregation in accordance to an embodiment of the invention At step 601, sequentially server/aggregator node broadcasts "Hello" message in the network periodically.

At step 602, the server node waits for response to its message broadcasted in step 601.

At step 603, the server node monitors or tracks whether there is any response from any nodes in the network.

At step 604, active nodes in the network are identified those respond to the server node's message and grouped into clusters, each cluster with four or five active nodes.

At step 605, the server node selects two nodes from each cluster and groups them to form friend pair, giving rise to formation of two friend pairs in each cluster of the network.

Figure 7:
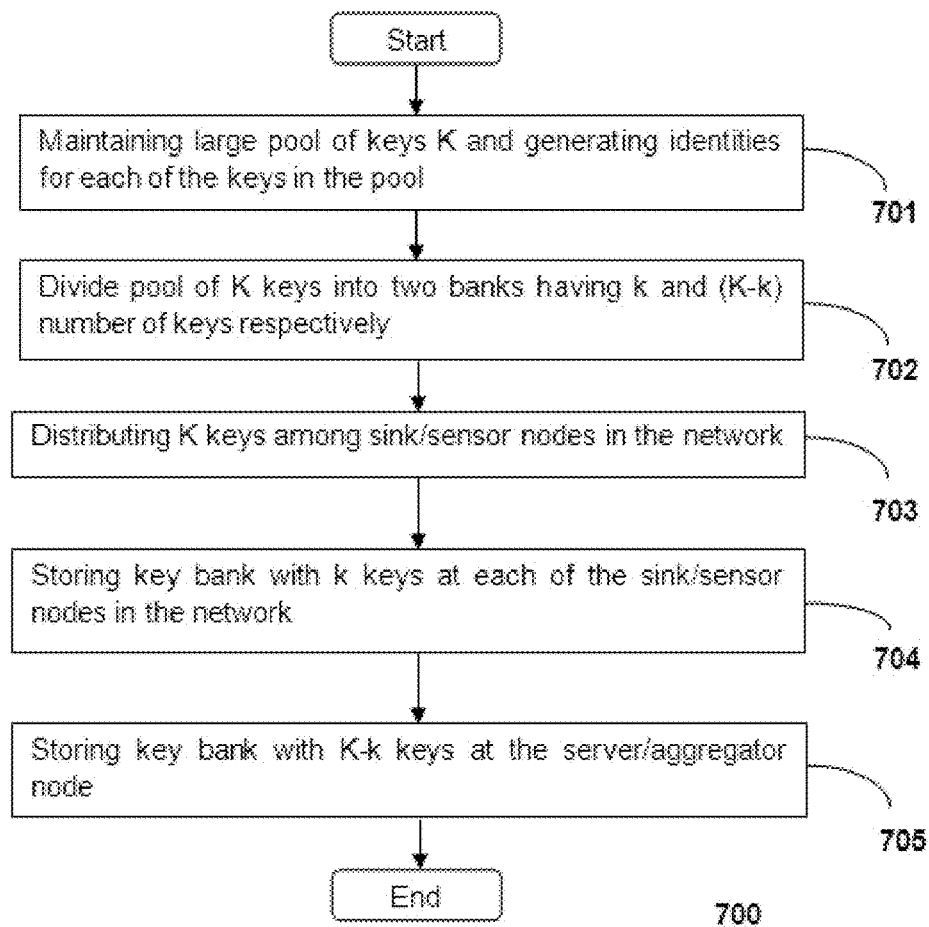
FIG. 7 is a flow chart 700 describing the pre-distribution phase establishing a secure communication between sensor nodes and a server node in a wireless sensor network during data aggregation in accordance to an exemplary embodiment of the invention.

FIG. 7 is a flow chart 700 describing the pre-distribution phase for establishing a secure communication between sensor nodes and a server node in a wireless sensor network during data aggregation in accordance to an embodiment of the invention.

At step 701, a pool of large number of keys (K) with their identities generated is maintained.

At step 702, the pool consisting K number of keys is divided into two banks having k and K-k keys respectively.

At step 703, the pool of K keys are randomly distributed among multiple sink/sensor nodes in the network.

At step 704, the key bank with k keys is shared and stored at each of the sink/sensor nodes in the network.

At step 705, the key bank with K-k keys is shared and stored at the server/aggregator node.

Figure 8:
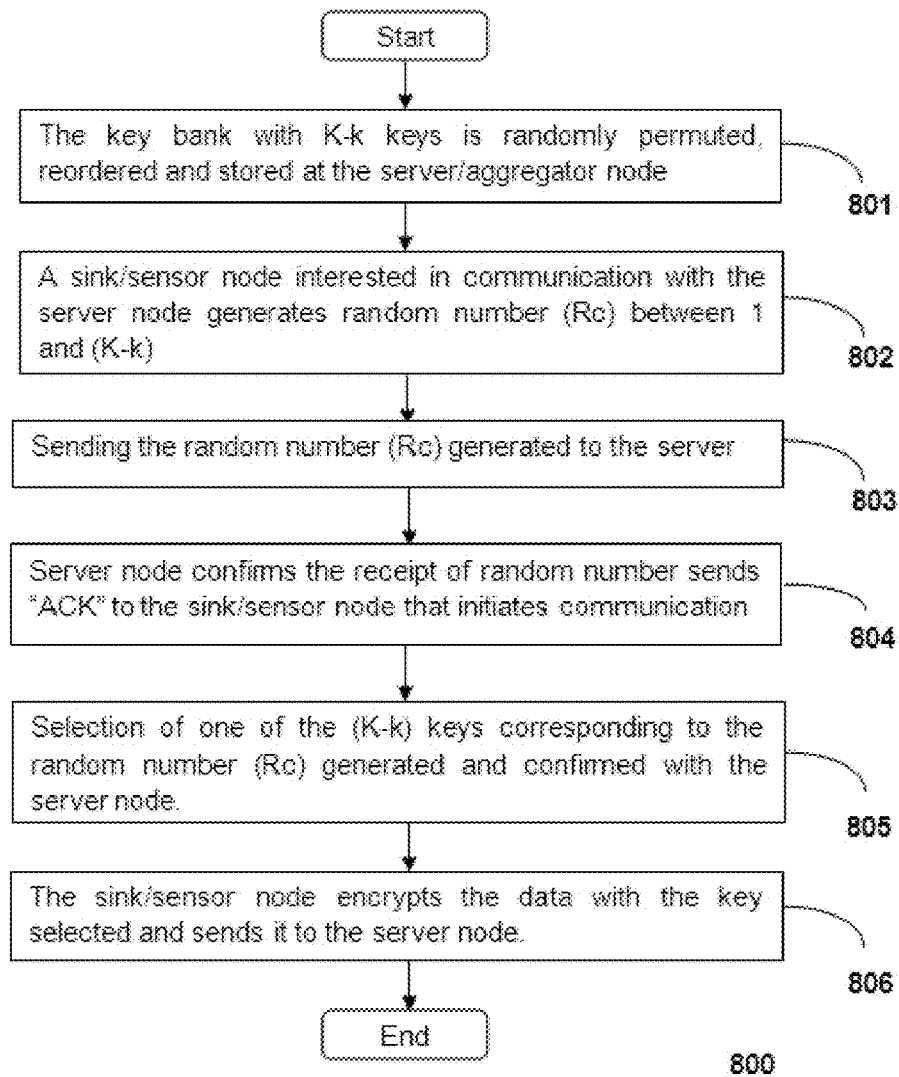
FIG. 8 is a flow chart 800 describing the steps for establishing secure communication between at least one of the multiple sink/sensor nodes in the network with the server/aggregator node in accordance to an exemplary embodiment of the invention.

FIG. 8 is a flow chart 800 describing the steps for establishing secure communication between at least one of the multiple sink/sensor nodes in the network with the server/aggregator node in accordance to an embodiment of the invention.

At step 801, the key bank with K-k keys are randomly permuted and reordered and stored at the server/aggregator node.

At step 802, a sink/sensor node interested in sending data collected by it for aggregation at the server/aggregator node generates random number (Rc) between 1 and (K-k).

At step 803, the sink/sensor node sends the random number (Rc) generated to the server/aggregator node in the form of plain text.

At step 804, the server node confirms the receipt of the random number and is assured that the sink/sensor node interested in communication will encrypt the data to be shared with a key corresponding to the random number generated and therefore sends ACK signal to the sink/sensor node initiating communication.

At step 805, the sink/sensor node selects one of the key from (K-k) keys corresponding to the random number generated.

At step 806, the sink/sensor node encrypts the data to be sent to the server with the key selected for enabling secure communication and preserving privacy.

Figure 9:
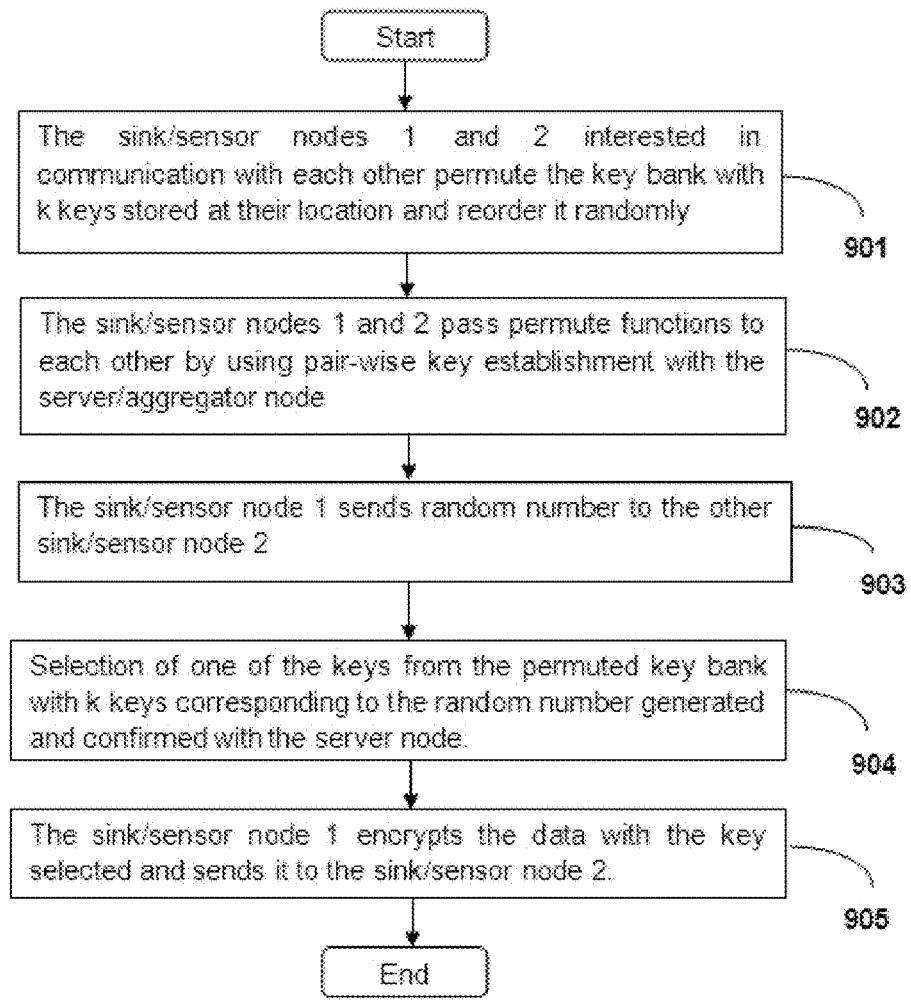
FIG. 9 is a flow chart 900 describing the steps for establishing secure communication among two sink/sensor nodes in the network in accordance to an exemplary embodiment of the invention.

FIG. 9 is a flow chart 900 describing the steps for establishing secure communication among two sink/sensor nodes via server/aggregator node in the network in accordance to an embodiment of the invention.

At step 901, the sink/sensor nodes 1 and 2 interested in communication with each other randomly permutes and reorders the key bank with k keys stored at their location.

At step 902, the sink/sensor nodes 1 and 2 pass permute functions to each other through the server node using their pair-wise key with the server node.

At step 903, sink/sensor node 1 sends a random number to sink/sensor node 2 to indicate the key number for establishing secure communication.

At step 904, selection of one of the k keys corresponding to the random number send is made.

At step 905, sink/sensor node 1 transmit data to be sent to the sink/sensor node 2 by encrypting that data with the key selected.

Thus, the self-adaptive cluster formation and twin-key management scheme enable for efficient private preservation algorithm in the network where no peer-to-peer communication mode exists between the multiple sink/sensor nodes in the network. The method requires less computational complexity for implementing the privacy preservation algorithm and avoids the sharing of keys to the third party when two nodes are communicating with each other for sharing the data collected at different regions in the network.

We claim:

1. A method for securely aggregating data in a non-hierarchical wireless network by robust twin-key management scheme, the method comprising processor implemented steps of:
    grouping a first set of active nodes to form one or more clusters wherein the one or more clusters form a second set of active nodes comprising four or more active nodes of the first set of nodes;
    dividing the second set of active nodes to form two or more friend pairs, each friend pair comprising two or more nodes of the second set of active nodes;
    maintaining a pool of K number of keys and dividing the pool of K number of keys into k number of keys and (K-k) number of keys;
    randomly distributing the (K-k) number of keys to the first set of active nodes in the network;
    sharing the (K-k) number of keys with a server node for enabling secure communication between each individual node of the first set of active nodes in the network with the server node wherein pattern of sharing of the (K-k) number of keys are stored at the server node for each active node of the first set of active nodes;
    randomly distributing k number of keys to the first set of active nodes;
    sharing the k number of keys with the server node for enabling secure communication between each individual node of the first set of active nodes via the server node wherein the k number of keys are stored at the first set of active nodes;
    establishing communication between at least one node from the first set of active nodes and the server node based on one or more first shared keys randomly selected from the (K-k) number of keys; and
    establishing communication between two or more nodes of the first set of active nodes via the server node based on one or more second shared keys randomly selected from the k number of keys;
    encrypting the data with the one or more first shared keys, to be sent to the server node by the at least one node from the first set of active nodes;
    encrypting the data with one or more second shared keys, to be sent between the two or more nodes via the server node; and
    aggregating securely the data in a non-hierarchical wireless network.

2. The method according to claim 1, wherein the server node is configured to aggregate data collected by the first set of active nodes.

3. The method according to claim 1, wherein for establishing communication between at least one node and the server node, the one or more first shared keys is selected from the (K-k) number of keys corresponding to one or more first random numbers generated by the at least one node and sent to the server node.

4. The method according to claim 3, wherein one or more subsequent communications between the at least one node and the server node are based on one or more different shared keys selected from the (K-k) number of keys corresponding to one or more different random numbers generated by the at least one node and sent to the server node.

5. The method according to claim 1, wherein for establishing communication between two or more nodes via the server node, the one or more second shared keys is selected from the k number of keys corresponding to one or more second random numbers generated by at least one node of the two or more nodes and sent to one or more other nodes of the two or more nodes via the server node.

6. The method according to claim 5, wherein subsequent communications between the two or more nodes via the server node are based on one or more different shared keys selected from the k number of keys corresponding to the one or more second random numbers.

7. The method according to claim 1, wherein N/4 clusters are formed in the network where N represents number of active nodes in the network and each cluster includes four nodes when N/4 is an integer value.

8. The method according to claim 7, wherein at least three clusters of the N/4 clusters include five nodes when N/4 is not an integer value.

9. A system for securely aggregating data in a non-hierarchical wireless network by robust twin-key management scheme, comprising:
- a first set of active nodes; and
- a server node configured to aggregate data collected by the first set of active nodes, the server node including a processor, and a memory storing processor-executable instructions comprising instructions to:
  - group a first set of active nodes to form one or more clusters wherein the one or more clusters form a second set of active nodes comprising four or more nodes of the first set of nodes;
  - divide the second set of active nodes to form two or more friend pairs, each pair comprising two more nodes of the second set of nodes;
  - maintain a pool of K number of keys and divide the pool of K number of keys into k number of keys and (K-k) number of keys;
  - randomly distribute the (K-k) number of keys to the first set of active nodes in the network;
  - share the (K-k) number of keys with the server node to enable secure communication between each individual node of the first set of active nodes in the network with the server node wherein pattern of distribution of the (K-k) number of keys are stored at the server node for each active node of the first set of active nodes;
  - randomly distribute k number of keys to the first set of active nodes;
  - share the k number of keys with the server node to enable secure communication between each individual node of the first set of active nodes via the server node wherein the k number of keys are stored at the first set of nodes;
  - establish communication between at least one node from the first set of active nodes and the server node based on one or more first shared keys randomly selected from the (K-k) number of keys; and
  - establish communication between two or more nodes from the first set of active nodes via the server node based on one or more second shared keys randomly selected from the k number of keys;
  - encrypt the data with the one or more first shared keys, to be sent to the server node by the at least one node from the first set of active nodes;
  - encrypt the data with one or more second shared keys, to be sent between the two or more nodes via the server node; and
  - aggregate securely the data in a non-hierarchical wireless network.

10. The system according to claim 9, wherein N/4 clusters are formed in the network where N represents number of active nodes in the network and each cluster includes four nodes when N/4 is an integer value.

11. The system according to claim 10, wherein at least three clusters of the N/4 clusters include five nodes when N/4 is not an integer value.

12. The system according to claim 9, wherein subsequent communications between the at least one node and the server node are based on one or more different shared keys selected from the (K-k) number of keys corresponding to one or more different random numbers generated by the at least one node and sent to the server node.

13. The system according to claim 9, wherein subsequent communications between the two or more nodes are based on one or more different keys selected from the k number of keys corresponding to one or more random numbers generated by at least one node of the two or more nodes and sent to one or more other nodes of the two or more nodes via the server node.

* * * * *